United States Patent [19]

Grossi

[11] Patent Number: 4,960,042

[45] Date of Patent: Oct. 2, 1990

[54] DEVICE FOR FROTHING AND HEATING MILK FOR BEVERAGES

[76] Inventor: Lucio Grossi, Via Sylva, 30 Bergamo, Italy

[21] Appl. No.: 359,738

[22] Filed: May 31, 1989

[30] Foreign Application Priority Data

Jun. 1, 1988 [IT] Italy .............................. 20828 A/88
May 26, 1989 [IT] Italy .............................. 21159 B/89

[51] Int. Cl.$^5$ .............................................. A47J 31/40
[52] U.S. Cl. .............................. 99/293; 261/DIG. 76; 261/DIG. 16
[58] Field of Search ............... 99/279, 293, 300, 288, 99/294, 323.3; 426/433; 261/DIG. 76, DIG. 16; 126/369, 369.1

[56] References Cited

U.S. PATENT DOCUMENTS 4,565,121  1/1986  Ohya ............................. 99/293
4,632,024  12/1986  Cortese ....................... 99/293
4,800,805  1/1989  Mahlich ................... 261/DIG. 76
4,852,473  8/1989  Bolivar ........................ 99/293

*Primary Examiner*—Robert W. Jenkins
*Attorney, Agent, or Firm*—Herbert Dubno

[57] ABSTRACT

Device for frothing and heating milk for beverages, consisting of a substantially tubular cylindrical body (1) connected to the steam outlet tube (3) of a machine for preparing hot beverages, the cylindrical body having within it a first nozzle (8), outside which nozzle there is, within the cylindrical body, a chamber (12) into which opens a milk intake tube (12a) from a vessel (4), the nozzle (8) being located above a constriction (10) followed by a second nozzle (11, 111) outside which, within the cylindrical body, is formed a chamber (16, 116) having one or more apertures (17) communicating with the outside and at least one aperture (18, 118) communicating with the inside of the nozzle (11, 111), beneath which there is an outlet duct (23, 22) leading to the outside, where a vessel may be placed to receive the frothed milk.

7 Claims, 2 Drawing Sheets

DEVICE FOR FROTHING AND HEATING MILK FOR BEVERAGES

FIELD OF THE INVENTION

The present invention relates to a device for frothing and heating milk for beverages.

THE RELATED ART

In order to produce hot milk-based beverages, such as cappuccino coffee and similar beverages, machines are used which produce steam by which the milk to be used is heated and mixed with air in order to produce a surface froth which is agreeable to the consumer.

For this purpose, conventional machines have a steam outlet tube which is inserted into the milk container and bubbles the heating steam through the milk; during this operation, the container is also agitated in a suitable way in order to incorporate into the milk the air necessary for the production of the mixture which forms the froth.

The result of this operation, however, is dependent on the ability of the person performing it, who must act in a suitable way to obtain the desired effect.

This is undesirable, particularly for the domestic production of such beverages by persons who may not always have the necessary experience to obtain satisfactory results.

Frothing and heating devices using steam and operating automatically have been proposed, but these devices make use of chambers of complex configuration and have small passage sections and micrometric devices to regulate these sections, and they are consequently difficult to construct and clean, as well as being subject to the formation of milk deposits during use, which changes the preselected section sizes and makes the operation of the whole device unreliable.

It is therefore necessary to provide a device which enables frothed milk to be produced for beverages; which is suitable for connection to the steam outlet pipe of a coffee-making machine for public or domestic use; which enables the requisite froth to be produced automatically, independently of the experience of the user; which is of simple design, with large passage sections to ensure constant quality of operation over a period of time; and which can be easily dismantled and cleaned, to ensure the hygiene and quality of the beverages prepared in the case of prolonged stoppages of the machine, but which also permits periodic automatic washing with the machine assembled when the stoppage of the machine is not too prolonged.

SUMMARY OF THE INVENTION

These results are obtained by the present invention, which comprises a device for frothing and heating milk for beverages, consisting of a substantially tubular cylindrical body connected to the steam outlet tube of a machine for preparing hot beverages, the said cylindrical body having within it a first nozzle outside which is formed, within the cylindrical body, a chamber into which the milk intake pipe from a container opens, the said nozzle being located above a constriction followed by a second nozzle outside which, within the cylindrical body, is formed a chamber having one or more apertures communicating with the outside and at least one aperture communicating with the inside of the nozzle, below which there is an outlet duct leading to the outside, where a vessel may be placed to receive the frothed milk.

The said second nozzle may conveniently be formed within a part of the body delimited above and below by elastic sealing means which define a chamber communicating with the internal part of the said nozzle through at least one radial hole in the wall of the nozzle.

Alternatively, the said constriction may be extended downwards to open into an extension of the said cylindrical body, forming a second nozzle outside which is formed a chamber made to communicate with the lower part of the cylinder by means of an axial passage and with the interior of the nozzle by means of at least one radial hole.

It is also specified that the tubular body is made in a number of demountably interconnected consecutive parts, consisting of a first part connected to a fixed connector integral with the steam outlet tube, having the first nozzle at its end, to which first part is coupled a second part forming a chamber around the first nozzle and having the second nozzle at its end, and also having a tubular connector in communication with the chamber surrounding the first nozzle, to which connector is attached a tube to draw in milk from a corresponding vessel, a third part being coupled to the second part and forming a chamber around the second nozzle, with one or more apertures communicating with the outside and including the outlet pipe towards the user.

The milk intake tube has adjustable means for reducing the internal section, and the second part of the tubular body is coupled to the first and the third part is coupled to the second with demountable frictional connections which also form seals between the parts.

The third part of the tubular body has a blocking base and an external collar forming an annular chamber which is open towards the end of the tubular body, and has apertures communicating with the interior of the tubular body to allow the frothed milk to flow out.

BRIEF DESCRIPTION OF THE DRAWING

Further details may be obtained from the following description, with reference to the attached drawings, in which.

DETAILED DESCRIPTION

Figure 1:
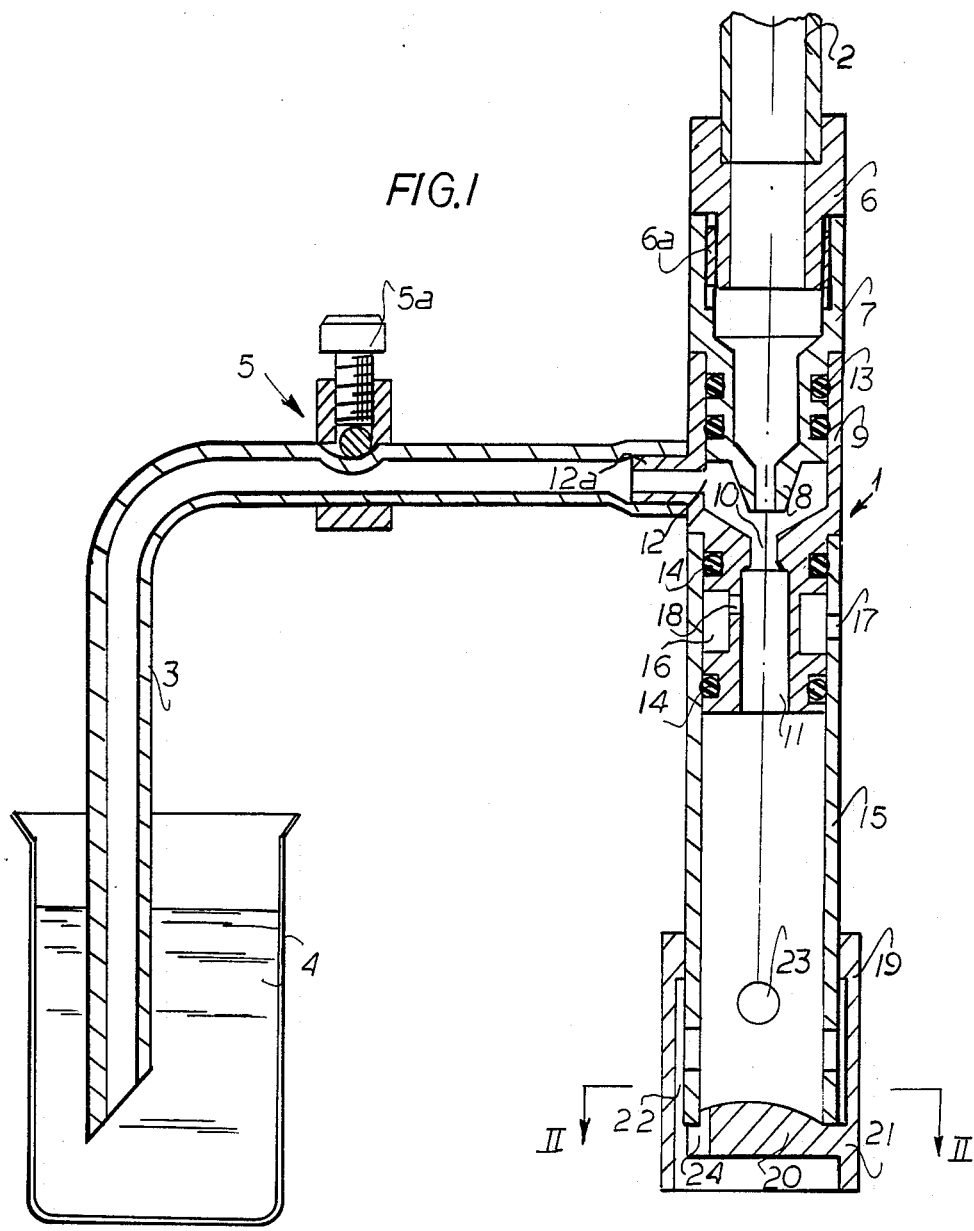
FIG. 1 is an axial cross section of the frothing device according to the invention.
Figure 2:
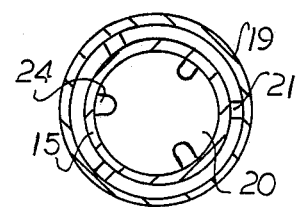
FIG. 2 is a cross section along the plane II-II of FIG. 1.

As FIGS. 1 and 2 show, a first form of embodiment of the frothing device according to the invention comprises a substantially cylindrical body 1, which is connected to the steam supply tube 2 of a coffee-making machine or similar; the body 1 is also connected to a pipe, 3, which may conveniently be made of a flexible material, with its end resting in a vessel 4 containing milk, and with a throttle 5 capable of reducing the passage section.

The body 1 is connected demountably to the tube 2 by a coupling 6 integral with the tube 2 and having means of fixing, consisting, for example, of a thread 6a.

The upper part, 7, of the body 1 is attached to this thread 6a, and has its front end. B, in the form of a nozzle, with an outlet section which is substantially smaller than its intake section which adjoins the coupling 6. The upper part 7 of the body is then inserted into the intermediate part 9, which has an internal constriction 10 facing the front nozzle end of part 7 and a front end 11, also in the form of a nozzle, with a section greater than that of the nozzle end 8 of part 7.

The intermediate part 9 forms an intake chamber 12 around the nozzle 8, above the constriction 10, this chamber having a connector 12a to which the flexible pipe 3 is attached.

Part 9 may conveniently be frictionally attached to the upper part 7 by means of elastic sealing rings 13 fitted to part 7, which also provides a seal between the parts; part 9 also has elastic sealing rings 14 which form a sealed frictional connection to the lower part 15 of the body, a chamber 16 being formed between the rings.

In the upper part of part 15 there is also an air intake aperture 17 in the chamber 16, which in turn communicates through an aperture 18 with the interior of the nozzle 11. At the end of part 15 there is a collar 19. external to part 15, which is partially blocked by a base 20, connected to the collar 19 by the braces 21 or similar devices.

The collar 19 forms an annular space 22 surrounding part 15 and opening to the outside, and having inlet apertures 23; the base 20 is also provided with drip holes, 24.

The steam supplied from the tube 2 is accelerated inside the nozzle 8 of the upper part 7, creating a reduced pressure in the constriction 10 in front of the nozzle, which draws the milk to be frothed into the chamber 12 surrounding the nozzle 8, through the pipe 3.

The milk which has been drawn in is accelerated in the nozzle 11 by the steam, and causes a reduction in pressure in the chamber 16 surrounding the nozzle 11, so that air is drawn into the chamber from the outside through the hole 17, and flows through the hole 18 into the nozzle 11 where it is mixed with the milk to form a froth.

The hole 17 and the hole 18 are of a fairly large size, and their diameters are not critical; they may conveniently be arranged in diametrical opposition to avoid possible emissions of spray through the hole 17 on starting or stopping.

The froth which has been formed then flows to the outside through the passages 23 and the space 22, and is consequently decelerated and uniformly distributed, while the base 20 prevents a direct outflow at high velocity. The dimensions of the nozzle 8, the constriction 10 and the nozzle 11, as well as those of the holes 17 and 18, are designed to produce a ratio between milk and air which is suitable to form the desired froth; by adjusting the screw 5a of the throttle 5 it is also possible to change the quantity of milk drawn in by the steam, thus varying its temperature. The formation of the froth is consequently made particularly easy and does not require any particular skill or dexterity on the part of the operator, since it is entirely dependent on the geometrical characteristics of the device.

The device according to the invention is of notable simplicity and is particular easy to dismantle and clean; the parts in contact with the milk and subject to incrustation by the formation of froth deposits, namely parts 9 and 15, can be rapidly unscrewed from their locations and placed in ordinary dishwashers or similar machines for frequent washing to ensure that the device remains hygienic.

The external surface of the nozzle, 8, of the upper part, 7, which comes into contact with the milk, may easily be cleaned after the removal of part 9; complete cleaning of part 7, which is required less often, may also be performed in a simple way by unscrewing it from the thread 6a of the connector 6.

This arrangement described above is particularly suitable when substantially continuous operation of the machine is required, with conveniently frequent intakes of milk which prevent excessive stoppages of the flow of milk particles in their path; however, if the operating cycles are less frequent and the device remains inactive for sufficiently long periods, some milk particles, sucked into the return path as a result of the pressure drop, may remain as deposits in the annular chamber 16, causing the partial obstruction of the external air intake hole 17, which results in a reduction in the quantity of air taken in to form the froth when the operating cycle is resumed.

Figure 3:
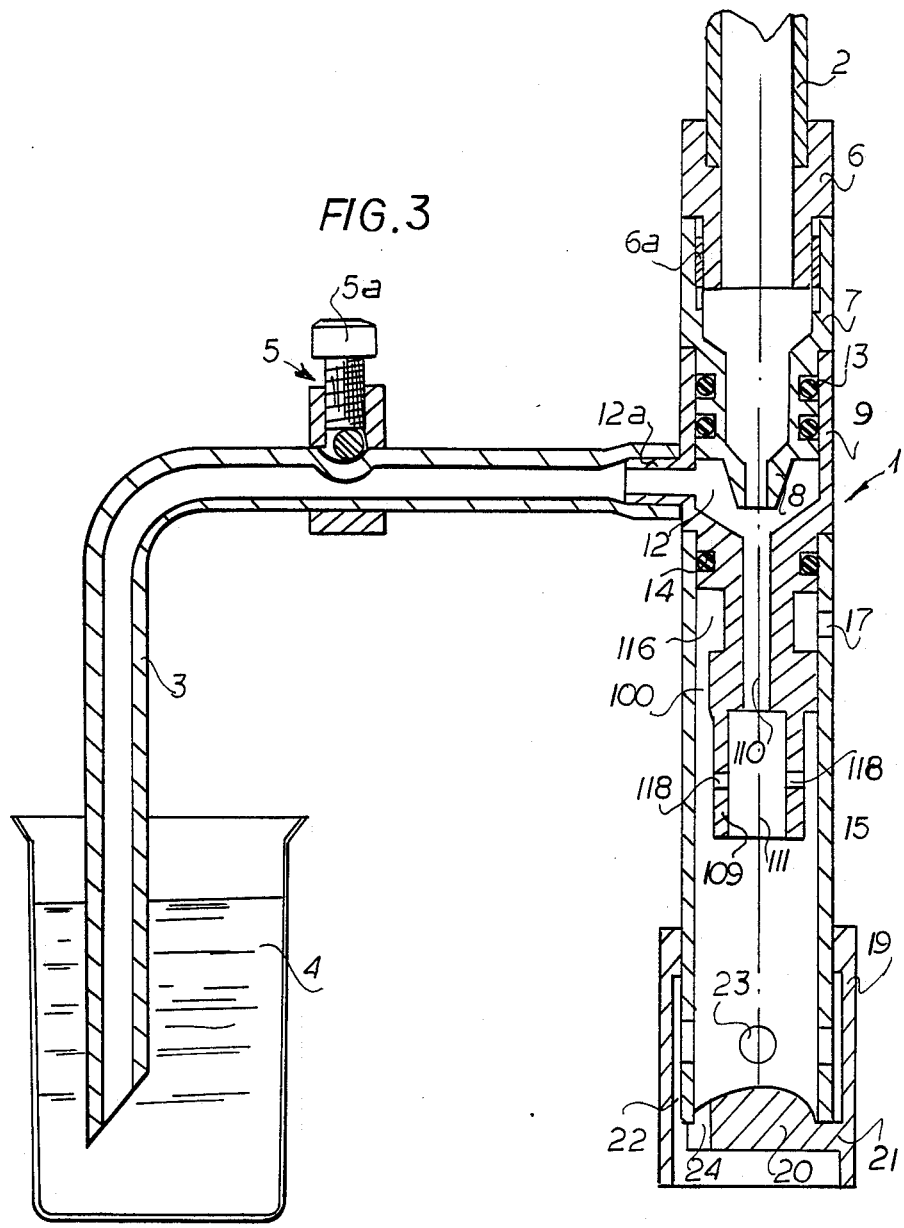
FIG. 3 is an axial cross section of a variant embodiment of the device according to the invention.

Consequently, a variant embodiment of the device is specified, which, as illustrated in FIG. 3, comprises an intermediate part 9 which forms an intake chamber 12 around the nozzle 8, above a constriction 110 which is extended downwards to open into an extension 109 of the said cylindrical body 9, forming an additional chamber 111, also in the form of a nozzle, in whose walls there are two radial holes 118 which open into the lower part 15 of the cylindrical body 1.

Part 9 may conveniently be attached by friction to the lower part 15 by means of an elastic sealing ring 14, thus forming an annular chamber 116 which communicates with the outside through a radial hole 17 formed in the wall of part 15 and with the lower part of part 15 through an axial passage 100. In this way the effect of the double nozzle for the frothing of the milk is kept unchanged, while any milk returning upwards is guided into a different path making it difficult to reach the chamber 116 and the external air intake hole 17, since milk which rises into the second nozzle 111 passes out throuh the holes 118 and falls into part 15 below; similarly, any residues which may rise into the chamber 116 and the hole 17 will tend to fall downwards through the passage 100, thus favouring the maintenance of optimal operating conditions for the device.

With the described configuration, automatic washing of the internal surfaces of the device is also particularly easy and effective in the case of a stoppage of the machine which is not particularly prolonged, since it is sufficient to place the intake tube 3 in communication with a vessel containing a cleansing liquid such as, for example, hot water, and to operate the device for a convenient number of cycles: the cleansing liquid, following the path of the milk, will remove any residues present on the walls.

Many variations may be made without thereby going beyond the scope of the invention in its general characteristics.

What is claimed is:

1. Device for frothing and heating milk for beverages comprising:
    a steam outlet tube which is part of a machine for preparing hot beverages; and
    a substantially tubular cylindrical body connected to said steam outlet tube, said body comprising:
    a first nozzle positioned within said body;
    a first chamber outward of said first nozzle and within said body;
    a milk intake tube opening into said chamber;
    a vessel communicating with said first chamber through said milk intake tube;

a constricted passage within said cylindrical body and positioned below said first nozzle;

a second nozzle positioned below said constricted passage;

a second chamber within said tubular cylindrical body and radially outward of said constricted passage;

at least one first aperture formed in said tubular cylindrical body communicating with an area outside of said second nozzle;

at least one second aperture formed in a wall of said second nozzle communicating with an area inside of said second nozzle; and an outlet duct positioned below said second chamber and having an end opening toward an outside of said tubular cylindrical body for delivering frothed milk.

2. Device for frothing and heating milk for beverages according to claim 1, wherein said tubular cylindrical body further comprises a body part delimited above and below by an elastic sealing means defining said second chamber and said second nozzle, said second nozzle being formed within said body part.

3. Device for frothing and heating milk for beverages according to claim 1, wherein said tubular cylindrical body further comprises a body part that defines said constricted passage, said constricted passage extending downward to an extension passage defining said second chamber and said second nozzle.

4. Device for frothing and heating milk for beverages according to claim 3, wherein said tubular cylindrical body is formed from a plurality of demountably interconnected consecutive parts comprising:

a first part connected to a fixed connector integral with said steam outlet tube, said first part having at an end thereof said first nozzle;

a second part coupled to said first part, said second part forming said first chamber around said first nozzle and having at an end thereof said second nozzle, said second part including said milk intake tube, a tubing being attached to said intake tube for drawing in milk from said vessel;

a third part coupled to said second part, said third part forming said second chamber around said second nozzle, said at least one first aperture formed in a wall of said third part communicating with an area outside of said tubular cylindrical body, and said third part including said outlet duct.

5. Device for frothing and heating milk according to claim 1, further comprising a tubing attached to said milk intake tube, said tubing being provided with a controllable means for reducing an internal cross section of said tubing.

6. Device for frothing and heating milk according to claim 1, wherein said second part is coupled to said first part and said third part is coupled to said second part with demountable frictional means which also form seals between said parts.

7. Device for frothing and heating milk according to claim 1, wherein said third part is provided with a blocking base and an external collar forming an annular chamber open towards an end of said tubular cylindrical body, said collar having at least one aperture communicating with an interior of said tubular cylindrical body and allowing said frothed milk to flow out.

* * * * *